United States Patent [19]

Heidenreich

[11] 4,217,210
[45] Aug. 12, 1980

[54] PROCESS AND MEANS FOR BREAKING EMULSIONS

[75] Inventor: Johann Heidenreich, Bondy, France

[73] Assignee: Societe Anonyme dite: Technime S.A., Buchelay, France

[21] Appl. No.: 927,128

[22] Filed: Jul. 21, 1978

[30] Foreign Application Priority Data

Jul. 21, 1977 [FR] France ............................... 77 22426

[51] Int. Cl.$^2$ ......................... B01D 15/00; C02B 1/20
[52] U.S. Cl. ......................................... 210/28; 210/43; 210/47; 210/DIG. 5; 210/DIG. 26; 252/358
[58] Field of Search ................... 210/24, 31 C, 32, 40, 210/59, 198 C, DIG. 5, DIG. 26; 55/74; 162/29; 423/275, 266, 625, 629, 630; 156/605, 606, DIG. 61; 252/358

[56] References Cited

U.S. PATENT DOCUMENTS

| 1,993,761 | 3/1935 | Tippins | 252/358 X |
| 3,342,742 | 9/1967 | Cocks | 252/358 X |

FOREIGN PATENT DOCUMENTS

| 197806 | 6/1978 | Fed. Rep. of Germany | 210/DIG. 5 |
| 1420394 | 1/1976 | United Kingdom | 210/DIG. 26 |

Primary Examiner—Charles N. Hart
Assistant Examiner—Ferris H. Lander
Attorney, Agent, or Firm—Lewis H. Eslinger

[57] ABSTRACT

The present invention relates to a process for breaking emulsions and suspensions, which can be used more particularly in the purification of industrial sewage, wherein, accompanied by stirring the emulsions and suspensions to be treated are treated by means of a liquid reagent chosen from the aqueous dispersions and solutions comprising:

(a) an adsorbent substance and
(b) aluminium or an aluminium derivative, particularly $AlCl_3$, $Al_2O_3$, $Al(OH)_3$, said liquid reagent being obtained from water, products (a) and (b) and a substance chosen from acids and bases, in such a way that the microcrystals of the aluminium derivatives are associated with the active sites of (a).

8 Claims, 1 Drawing Figure

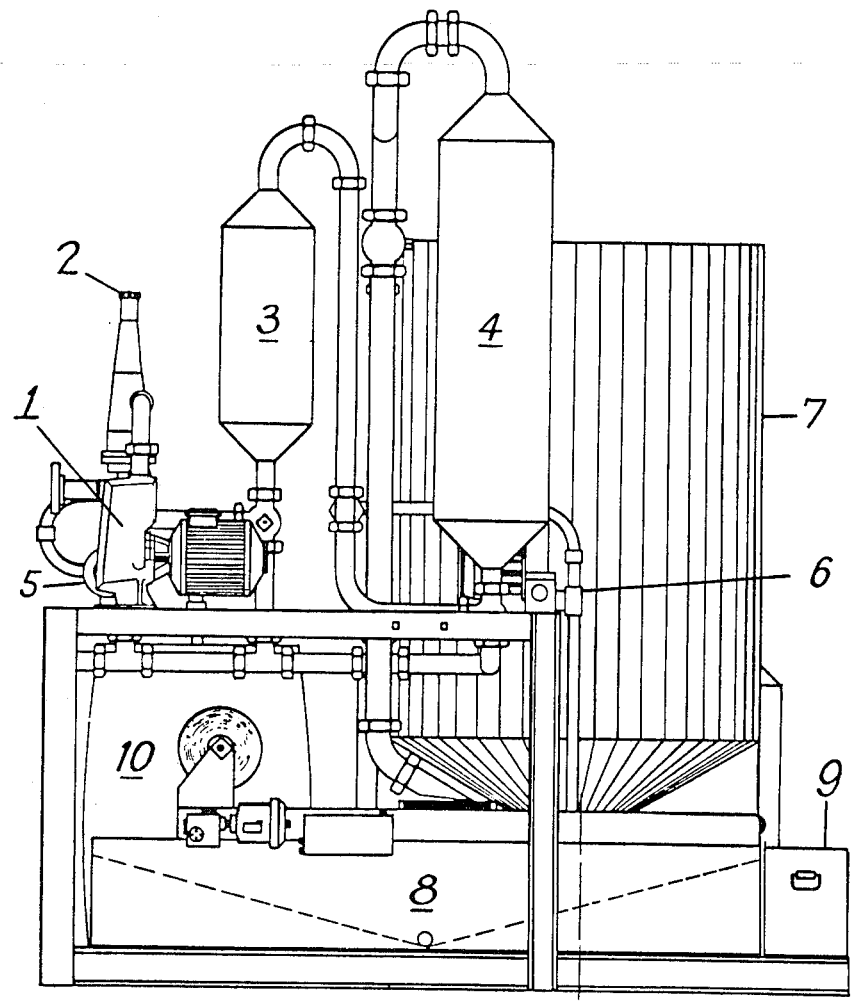

PROCESS AND MEANS FOR BREAKING EMULSIONS

BACKGROUND OF THE INVENTION

The present invention relates to a process for breaking emulsions and suspensions and means permitting the performance of this process. It is particularly useful in the field of the purification of industrial sewage.

The principle of the invention is based on the formation of microcrystals of aluminium derivatives at the active sites of an adsorbent substance, more particularly a bentonite. This formation of microcrystals makes it possible to limit the swelling of the adsorbent substance in water.

In the present specification the term "emulsion" designates not only any emulsion, but also any suspension.

Hitherto either aqueous solutions of metal salts or powders have been used for the breaking of emulsions, particularly in the treatment of industrial sewage.

Aqueous solutions of metal salts have the disadvantage of forming with most emulsified systems a coalesced phase, i.e. there is creaming of the disperse phase which makes it difficult to separate the phases. Moreover the use of these metal salts always requires a neutralisation of the reaction mass, because acids form by hydrolysis. There are also disperse systems which resist the action of metal salts and which cannot therefore be separated.

Powders, which are more particularly used for the purification of sewage and in particular those described in published German Applications DOS Nos. 2 507 733 and DOS 2 527 987 are essentially formed from adsorbent substances and metal salts. They have numerous disadvantages. In particular, the salts must not have hygroscopic properties, which would cause a premature reaction between the different constituents of the powders and would lead to a significant loss of reactivity. Powders cannot be used in continuously functioning processes in an industrially profitable manner. In particular the operating procedures given in Example 2 of DOS 2 507 733 in which a mixture of aluminum sulphate (12.5 kg) and kaolin (12.5 kg) is suspended in water (100 l) prior to purifying the sewage (10 m$^3$) do not permit treatment to be carried out on a continuous basis because said mixture gives a gel and there is no microcrystallisation of the active sites of the kaolin.

Finally powders lead to the problem of dust formation and in many cases there is a danger of silicosis for personnel, whilst the use of such powders involves installations with large dimensions due to their limited solubility in the reaction mass.

BRIEF SUMMARY OF THE INVENTION

The object of the invention is to obviate the disadvantages of the prior art and proposes a process for breaking emulsions which can in particular be used in the purification of industrial sewage and which utilises special means, namely useful reagents comprising active earths and aluminium or an aluminium salt, whereby said active earths have been treated in such a way that their swelling in water is limited by the formation of microcrystals at their active sites.

The process which is proposed by this invention for breaking emulsions comprises the treatment of the emulsions and suspensions to be treated under stirring, by means of a liquid reagent chosen from aqueous solutions and dispersions comprising:
 (a) an adsorbent substance and
 (b) aluminium or an aluminium derivative, particularly AlCl$_3$, Al$_2$O$_3$, Al(OH)$_3$,
said reagent being obtained from water, products (a) and (b), and a substance chosen from acids and bases in such a way that the microcrystals of aluminium derivatives are associated with the active sites of (a).

In an advantageous manner it is recommended to use one part by weight of the reagent according to the invention with two to six parts by weight of emulsified oil. In a more general manner 0.5 to 8 kg of reagent according to the invention is used with 1 m$^3$ of emulsion or suspension. Within this range the quantity of reagent used is a function of the nature of the emulsion or suspension to be treated.

Among the suitable adsorbent substances (a) reference can in particular be made to bentonites and active earths, such as argillaceous and alkaline earths. Obviously it is possible to use mixtures of these substances. The adsorbent substances (a) which are suitable are mainly remarkable due to their ion exchange capacity and have active zones or sites. According to the invention said sites cause the formation of microcrystals by a local concentration of the metal salts in aqueous solution on the basis of a limiting concentration which remains below the saturation concentration. There is also a threshold value with a progressive dilution of the reagent in the reaction mass, whereby the cohesion forces between the bearing soil and the microcrystals are progressively reduced in proportion to the passage of said crystalline salts into solution. In this way the active earths are regenerated and regain their adsorption power so as to be able to act on the disperse phase as coagulation agents.

The preferred adsorbent substances according to the invention are bentonites, particularly sodium, calcium and magnesium bentonites, optionally associated with another active earth.

In order to illustrate the very specific nature of the reagents recommended by the invention comparative tests were performed with respect to the swelling capacity of the active earths conventionally used according to the prior art and the same active earths prepared according to the invention. These tests are summarised hereinafter.

In order to have a sufficiently fluid dispersion a suspension (A) is formed of 7.5 parts by weight of sodium bentonite in 92.5 parts by weight of a mixture constituted by CaCl$_2$ (1 part by weight), MgCl$_2$ (1 part by weight), aluminum hydroxide (1 part by weight) and distilled water (89.5 parts by weight) and a suspension (B) obtained by dispersing 37.5 parts by weight of the reagent of example 8 according to the invention in 62.5 parts by weight of distilled water, whereby suspension B contains 15 parts by weight of the sodium bentonite used in suspension A. The viscosity of A and B is measured by means of a consistometric device with an outflow opening diameter of 2.5 mm, according to French Standard AFNOR NF-T-30-014.

The following values were obtained as an average for three tests:
 A: outflow time: 47 s, viscosity: 17 cP
 B: outflow time: 33 s, viscosity: 6 cP.

Thus, B which contains twice as much sodium bentonite as A, has a viscosity which is approximately three times lower than that of A.

The dissolved salts modify the state of the electrical charges in the reaction mass and contribute to the coagulation of the disperse phase.

The result of the actions of the adsorbent earths and salts makes it possible to break the emulsions and contribute to the purification of industrial sewage.

In order to obtain an acid reagent it should be prepared by mixing the bentonite with an acid, particularly hydrochloric acid, and adding to the resultant mixture metallic aluminium, particularly in the form of a powder. The hydrochloric acid acts with the metallic aluminium to give $AlCl_3$. Obviously the metallic aluminum can be replaced by $AlCl_3$, $Al_2O_3$, $Al(OH)_3$. The presence of a bentonite or some other active earth prevents any escape of gaseous aluminium chloride to the outside of the mixture. The gas solidifies on the active sites of the earth and forms the microcrystals mentioned hereinbefore. In the same way a basic reagent is obtained by mixing the bentonite with a base, particularly NaOH, KOH and then adding Al, $AlCl_3$, $Al_2O_3$ or $Al(OH)_3$.

In addition to the adsorbent earth and aluminium $AlCl_3$, $Al_2O_3$ or $Al(OH)_3$ the reagent according to the invention may contain metals or metal salts. Among the metal salts reference can in particular be made to ferric chloride, calcium chloride, magnesium chloride, etc. These salts offer the advantage of adapting the reagent to the particular type of industrial sewage. In the same way it is possible to treat the active earth with sulphamic acid in order to obtain a reagent which can be used with sewage polluted by nitrites.

Other advantages and features of the invention can be gathered from the following non-limitative examples of the preparation of reagents and of using said reagents.

EXAMPLE 1

Preparation of an acid reagent

| Formulation: | hydrochloric acid ($d_4^{15}$ = 1.19) | 290 g |
|---|---|---|
| | Na or Ca bentonite | 500 g |
| | metallic aluminium | 10 g |
| | iron chloride in 20% aqueous solution (200 g/l) | 200 g |
| | water | 1 kg |

Fill the reactor with hydrochloric acid, dilute to approximately 25% with water, add bentonite, stir to homogeneity. Add to the reaction mass aluminum, stir until the end of the reaction, add iron chloride, stir until homogeneity and finally top up with water until there is a quantity of 1 kg of water.

EXAMPLE 2

Preparation of a buffered acid reagent

| Formulation: | hydrochloric acid ($d_4^{15}$ = 1.19) | 290 g |
|---|---|---|
| | Na or Ca bentonite | 500 g |
| | metallic aluminium | 10 g |
| | $FeCl_3$ in 20% aqueous solution (200g/l) | 100 g |
| | $CaCl_2$ in 30% aqueous solution (300g/l) | 50 g |
| | $MgCl_2$ in 30% aqueous solution (300g/l) | 50 g |
| | water | 1 kg |

Fill the reactor with hydrochloric acid, dilute with water to approximately 25%, add bentonite and stir to homogeneity. Add the aluminium to the reaction mass and stir up to the end of the reaction. Successively add iron chloride, calcium chloride and magnesium chloride, stir up to homogeneity. Leave to cool and finally top up with water up to a water quantity of 1 kg.

EXAMPLE 3

Preparation of an acid reagent

| Formulation: | hydrochloric acid ($d_4^{15}$ = 1.19) | 290 g |
|---|---|---|
| | Na or Ca bentonite | 400 g |
| | alumina | 100 g |
| | metallic aluminium | 20 g |
| | $FeCl_3$ in 20% aqueous solution (200g/l) | 200 g |
| | water | 1 kg |

Fill the reactor with hydrochloric acid, dilute with water to approximately 25%, add the bentonite and alumina, stir up to homogeneity. Add the aluminium to the reaction mass, stir until the end of the reaction. Add iron chloride and stir to homogeneity, then leave to cool and finally add the remaining water.

EXAMPLE 4

Preparation of a buffered acid reagent

| Formulation: | hydrochloric acid ($d_4^{15}$ = 1.19) | 290 g |
|---|---|---|
| | Na or Ca bentonite | 350 g |
| | clay | 50 g |
| | alumina | 100 g |
| | metallic aluminium | 10 g |
| | $FeCl_3$ in 20% aqueous solution | 100 g |
| | $CaCl_2$ in 30% aqueous solution | 100 g |
| | water | 1 kg |

Fill the reactor with hydrochloric acid, dilute with water as indicated hereinbefore, add bentonite, clay and alumina and stir up to homogeneity. Add the aluminium to the reaction mass and stir until the end of the reaction. Successively add iron chloride and calcium chloride, stir to homogeneity, leave to cool and finally add the reamining water.

EXAMPLE 5

Preparation of an alkaline reagent

| Formulation: | NaOH in 20% aqueous solution (200 g/l) | 480 g |
|---|---|---|
| | Na or Ca bentonite | 510 g |
| | metallic aluminium | 10 g |
| | water | 1 kg |

Fill the reactor with sodium hydroxide, dilute with water up to approximately 25%, add the bentonite and stir up to homogeneity. Add the aluminum, stir up to the end of the reaction, leave to cool and finally add the remaining water.

EXAMPLE 5b

The procedure of example 5 is repeated, but metallic aluminium is replaced by an equivalent quantity of $Al_2O_3$ or $Al(OH)_3$ in order to prevent the giving off of $H_2$ as a result of the action of NaOH on Al. The reagent obtained is just as effective as that of example 5.

EXAMPLE 6

Preparation of a buffered alkaline reagent

| Formulation: | NaOH in 20% aqueous solution | 460 g |
|---|---|---|
| | Na or Ca bentonite | 450 g |

|   |   |
|---|---|
| talc | 60 g |
| Al | 10 g |
| MgCl$_2$ | 20 g |
| water | 1 kg |

Fill the reactor with sodium hydroxide diluted with water to approximately 25%, add the bentonite and talc and stir to homogeneity. Then add aluminium to the reaction mass, stir until the end of the reaction, add the magnesium chloride, stir until homogeneity and finally add the remaining water.

EXAMPLE 6b

The procedure of example 6 is repeated, but the metallic aluminium is replaced by an equivalent quantity of Al$_2$O$_3$ or Al(OH)$_3$. The reagent obtained is just as effective as that of example 6.

EXAMPLE 7

Preparation of a nitrite reducing reagent

| Formulation: | | |
|---|---|---|
| | sulphamic acid in 25% aqueous solution (250 g/l) | 480 g |
| | Na bentonite | 480 g |
| | AlCl$_3$ in 15% aqueous solution (150 g/l) | 40 g |
| | water | 1 kg |

Fill the reactor with sulphamic acid, add bentonite and stir to homogeneity. Add the aluminium chloride and stir up to homogeneity.

EXAMPLE 8

Preparation of an acid reagent

| Formulation: | | |
|---|---|---|
| | hydrochloric acid (d$_4^{15}$ = 1.19) | 80 g |
| | Na bentonite | 400 g |
| | aluminium hydroxide | 50 g |
| | CaCl$_2$ | 130 g |
| | MgCl$_2$ | 90 g |
| | distilled water | 250 g |

The reagent is prepared in accordance with example 4 with respect to the order of introducing the ingredients. This reagent is diluted with water at the time of use, for example as indicated hereinbefore for obtaining suspension B.

The following examples 9 to 13 relate to the application according to the invention of the reagents described hereinbefore.

EXAMPLE 9

This example relates to the breaking of a mineral oil-based cutting emulsion with an initial pH of 10.

Add to the emulsion to be broken the quantity of acid reagent according to examples 1 or 3 necessary for effecting breaking (1 part by weight of reagent to 4 parts by weight of emulsion), stir vigorously. Breaking takes place within 3 to 5 seconds. Reduce the stirring speed to enable a block to form. If necessary add 5 to 10 g/m$^3$ of the reaction mass of a suitable polyelectrolyte to assist flocculation and separate the phases by filtration and/or decantation.

EXAMPLE 10

This example relates to the breaking of a synthetic oil-based rectifying emulsion in ultra-fine dispersion in the continuous phase of initial pH 8.5.

Add to the emulsion to be broken the quantity of buffered acid reagent according to examples 2 or 4 necessary for carrying out breaking (1 part by weight of reagent to 4 parts by weight of emulsion), breaking taking place within 3 to 5 seconds. Reduce the stirring speed to enable a block to form. If necessary add 5 to 10 g/m$^3$ of the reaction mass of a polyelectrolyte suitable for aiding flocculation and separate the phases by filtration and/or decantation.

EXAMPLE 11

This example relates to the breaking of a wire-drawing emulsion based on semi-synthetic oils and soapy substances with an initial pH of 9.5.

Add to the emulsion the quantity of buffered reagent according to examples 2 or 4 necessary for a satisfactory breaking and for transforming the water-soluble soapy substances into calcium soap. Then adopt the procedure of examples 9 or 10.

EXAMPLE 12

This example relates to the treatment of a rectifying emulsion based on synthetic oils and nitrites of pH 7.5 by means of the reagent of example 7.

Add to the emulsion to be treated the quantity of nitrite-reducing reagent necessary to give a pH of 3.5 to 4. After 10 seconds add to the reaction mass a base until a pH of 7 to 8 is obtained. Then adopt the procedure of examples 9 or 10.

EXAMPLE 13

This example relates to the treatment of scouring or pickling waste water with metal salts of an initial pH of 3.5.

Add to the water to be treated the quantity of alkaline reagent according to example 5 necessary for obtaining a pH of 7.5 to 8. In this pH range there is coprecipitation of the aluminium hydroxides and the other metals. The active earths exert an influence on the hydroxides formed to give a thick, dense and heavy flocculation which rapidly falls to the bottom of the decanter. The thus collected sludge can be dried according to a per se known method, in particular by means of a filter press or a centrifuge—decanter.

The object of the invention, namely the breaking of emulsions and suspensions, can advantageously be used in the treatment of oily emulsions and sewage. In particular the reagents according to the invention have proved to be very effective in tawing establishments, tanneries, slaughter-houses, foodstuff industry, the cosmetics industry, the treatment of sewage, the paints, paper and textile industries, dye-works and industrial laundries.

The drawing shows a movable installation permitting the continuous treatment of 5 to 10 m$^3$/h of industrial sewage. This installation, which can be carried on a truck or trailer for the treatment of the sewage of various industries on the basis of a few hours every week or month, comprises an automatic starting pump (1), a chamber (2) which serves as the primary breaking reactor, a second chamber (3) serving as a secondary breaking reactor, a flocculation reactor (4), a pump (5) for metering the reagent according to the invention, a pump (6) for metering the flocculating agent, a receptacle (7) which serves as a reservoir for the flocculating agent, a filter (8) permitting the automatic separation of the purified water from the sludge, a receptacle (9) for collecting the sludge and a receptacle (10) which serves as a reservoir for the breaking reagent according to the invention. Advantageously the primary breaking reactor (2) may be a cyclone-type apparatus.

The invention is not limited to the embodiments described and represented hereinbefore and various modifications can be made thereto without passing beyond the scope of the invention.

What is claimed is:

1. A process for the purification of industrial sewage by breaking emulsions or suspensions therein, comprising the steps of:
   (a) forming a liquid reagent in aqueous dispersion or solution form and comprising
      (1) an adsorbent substance selected from the group consisting of bentonite, argillaceous earths, alkaline earths and their mixtures,
      (2) at least one compound chosen from the group consisting of Al, $AlCl_3$, $Al_2O_3$ and $Al(OH)_3$,
      (3) an acid or a base, and
      (4) water,
      said liquid reagent having micro-crystals of the said aluminum derivatives associated with the active sites of said adsorbent substance; and
   (b) stirring the said emulsion or suspension to be treated with said liquid reagent.

2. A process as recited in claim 1 wherein the adsorbent substance is a bentonite associated with an active earth.

3. A process according to claim 1 wherein the liquid reagent contains at least one acid and is, if necessary, buffered.

4. A process according to claim 3 wherein the acid is hydrochloric sulphamic acid.

5. A process according to claim 1 wherein the liquid reagent contains at least one base and is, if necessary, buffered.

6. A process according to claim 5 wherein the base is NaOH or KOH.

7. A process according to claim 1 wherein the bentonite is calcium or sodium bentonite.

8. A process according to claim 1 wherein the said liquid reagent is used in a proportion of 0.5 to 8 kg of reagent per 1 $m^3$ of emulsion or suspension to be treated.

* * * * *